Dec. 8, 1942.　　　D. D. ROGERS　　　2,304,421
CUTTING APPARATUS
Filed Sept. 7, 1939　　　6 Sheets-Sheet 1
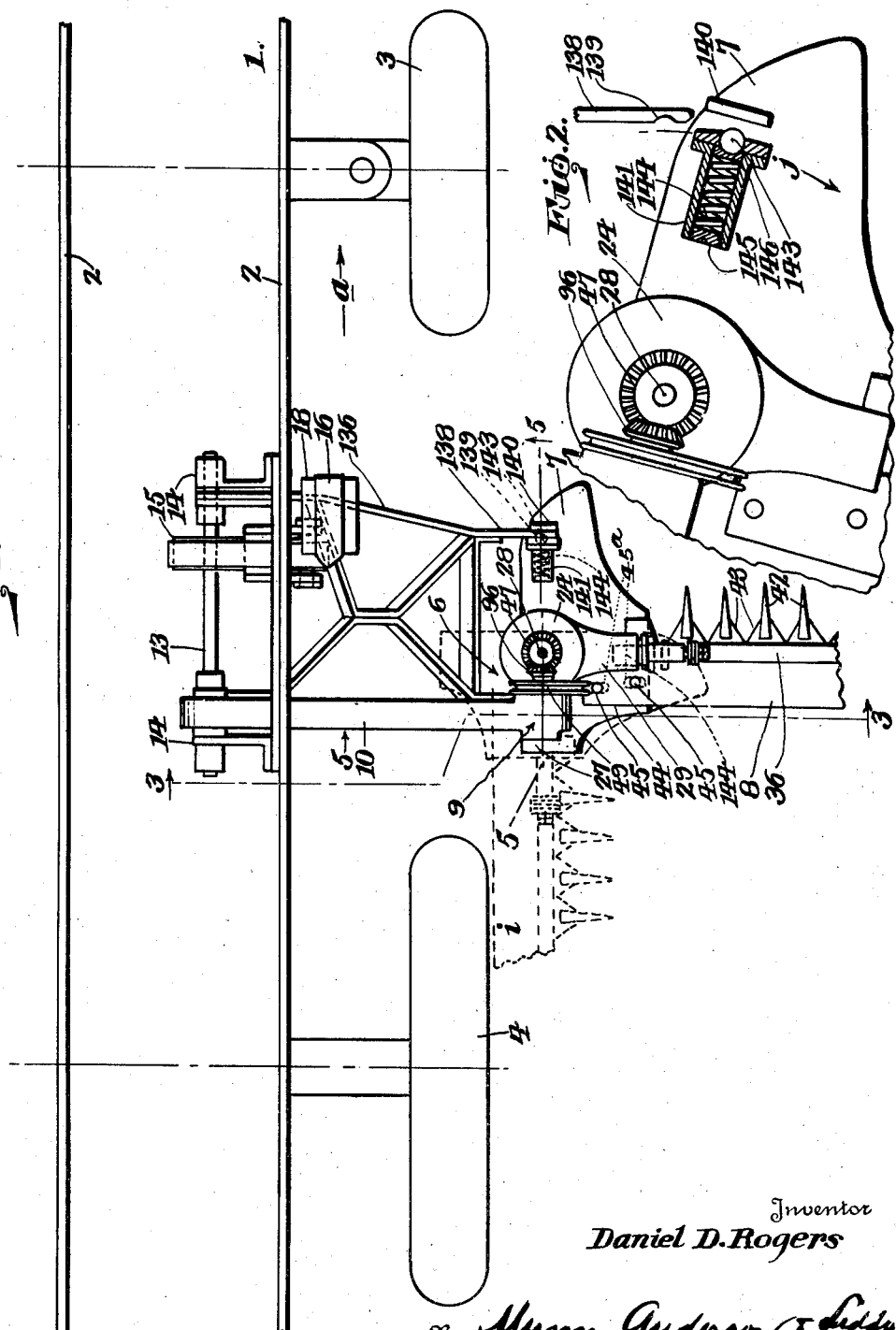
Inventor
Daniel D. Rogers
By Munn, Anderson & Liddy
Attorney

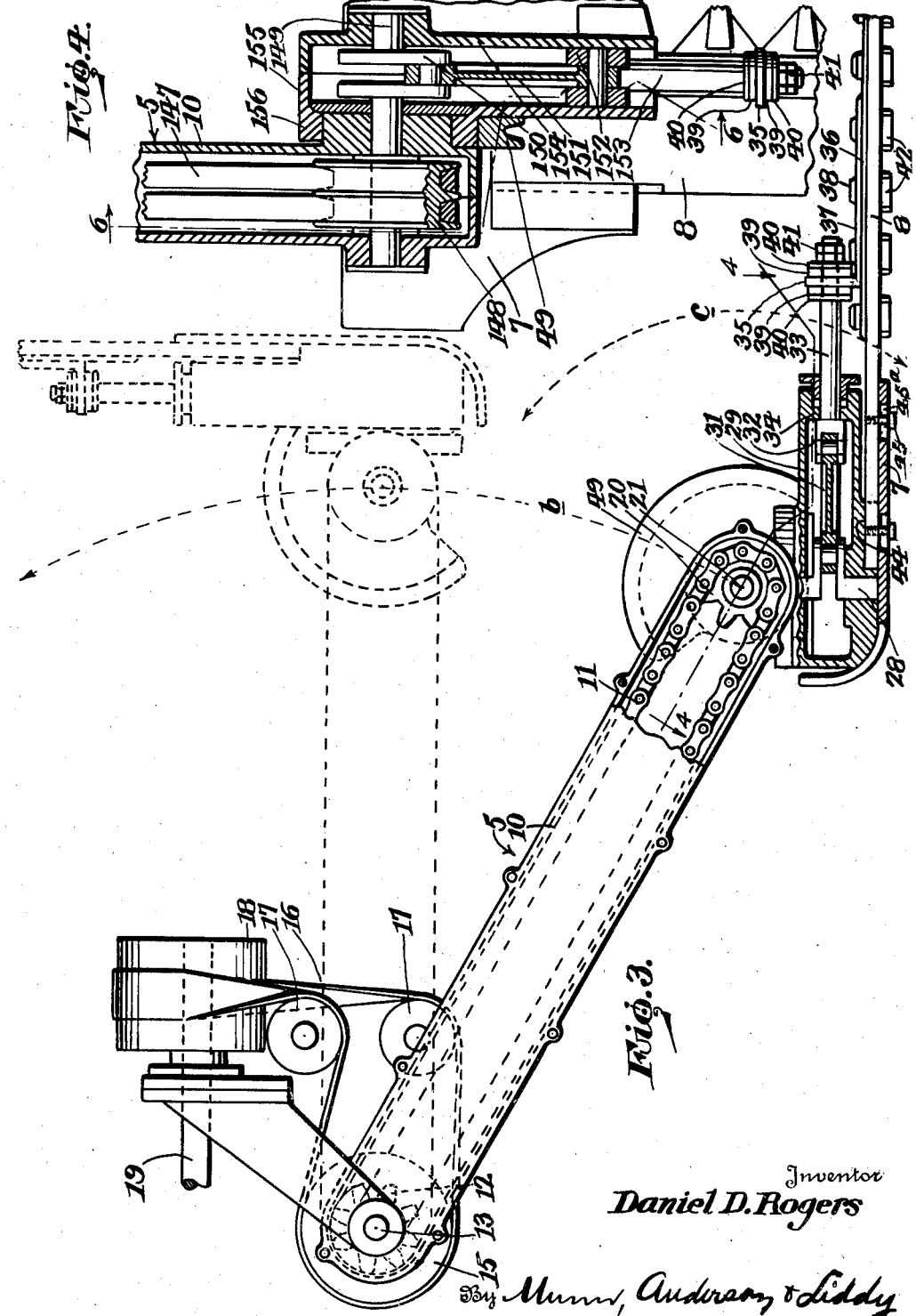

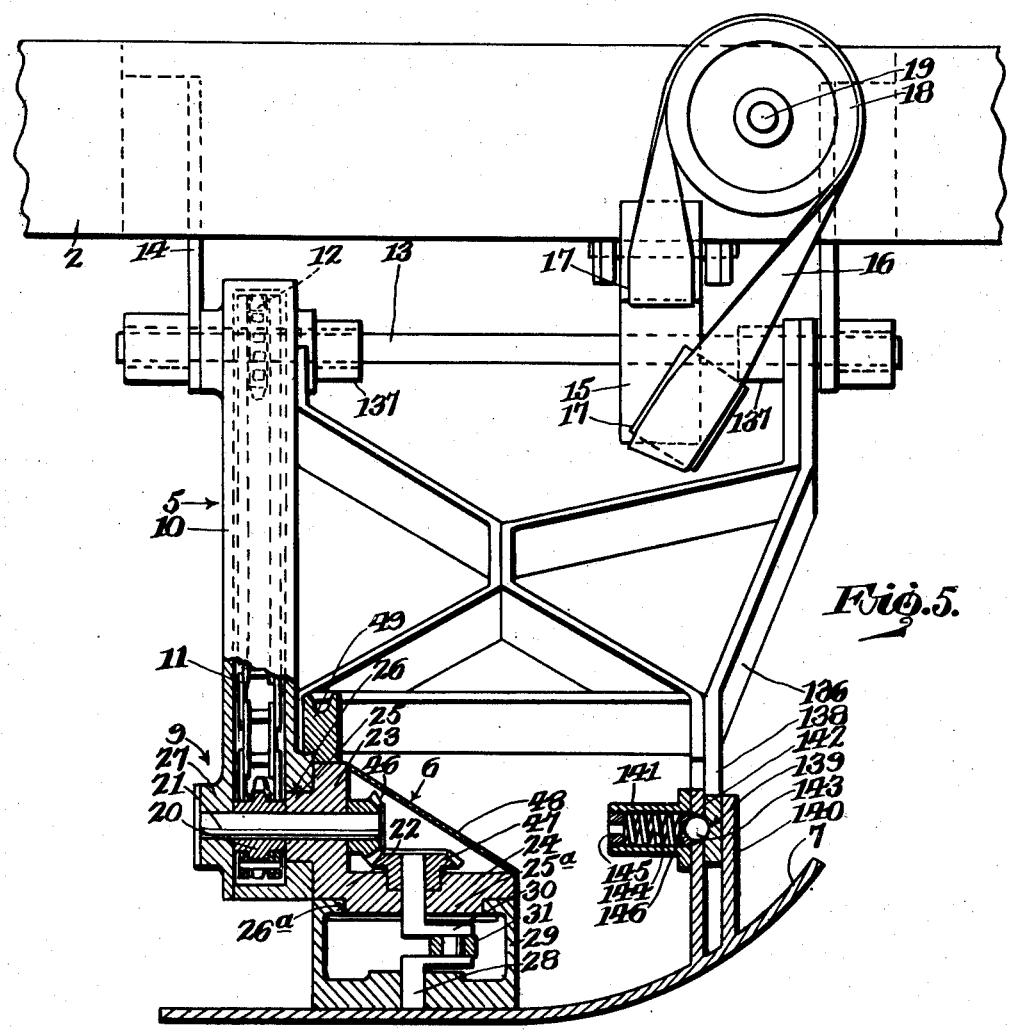

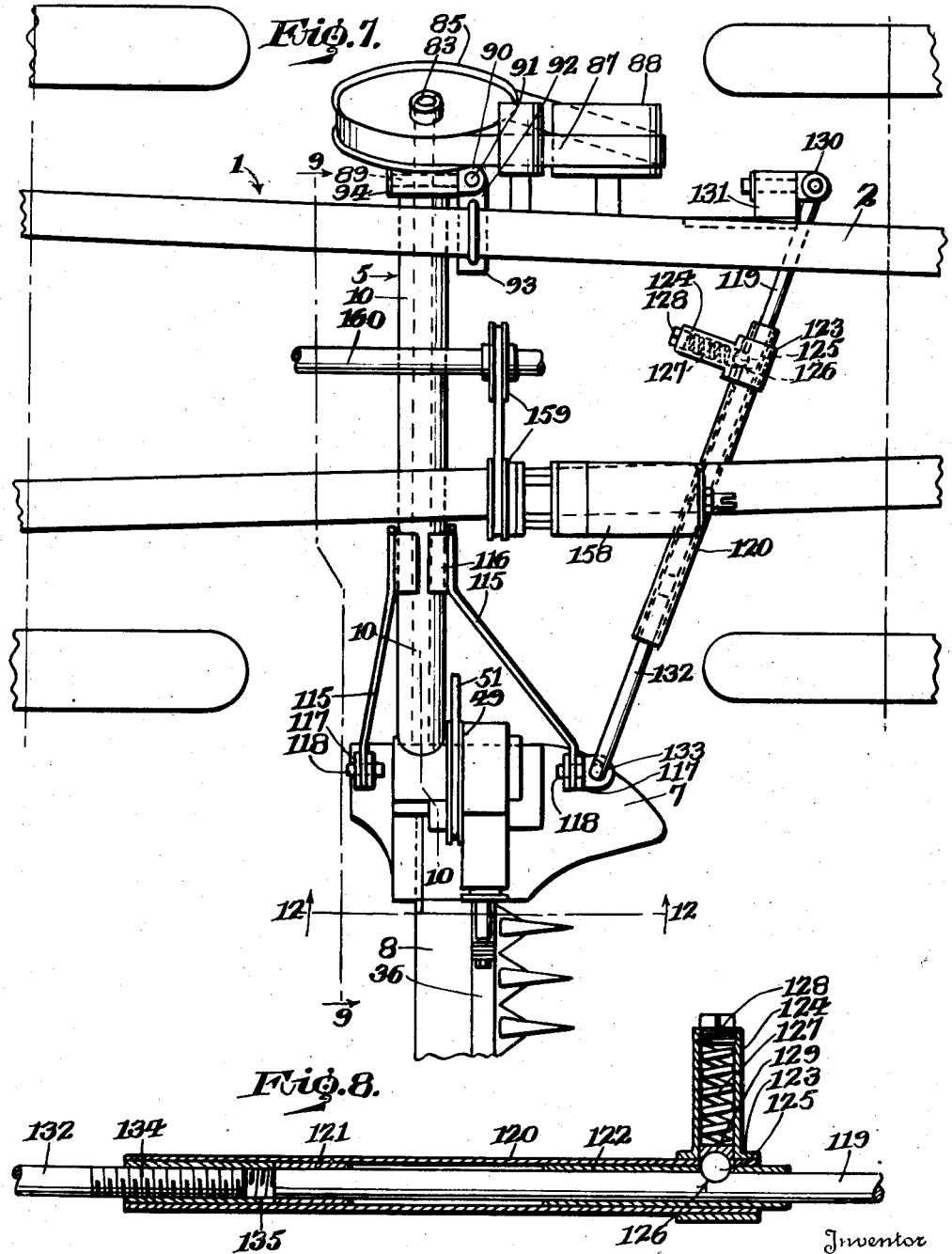

Dec. 8, 1942.          D. D. ROGERS          2,304,421
                       CUTTING APPARATUS
                   Filed Sept. 7, 1939        6 Sheets-Sheet 5

Inventor
Daniel D. Rogers

Dec. 8, 1942.  D. D. ROGERS  2,304,421
CUTTING APPARATUS
Filed Sept. 7, 1939  6 Sheets-Sheet 6
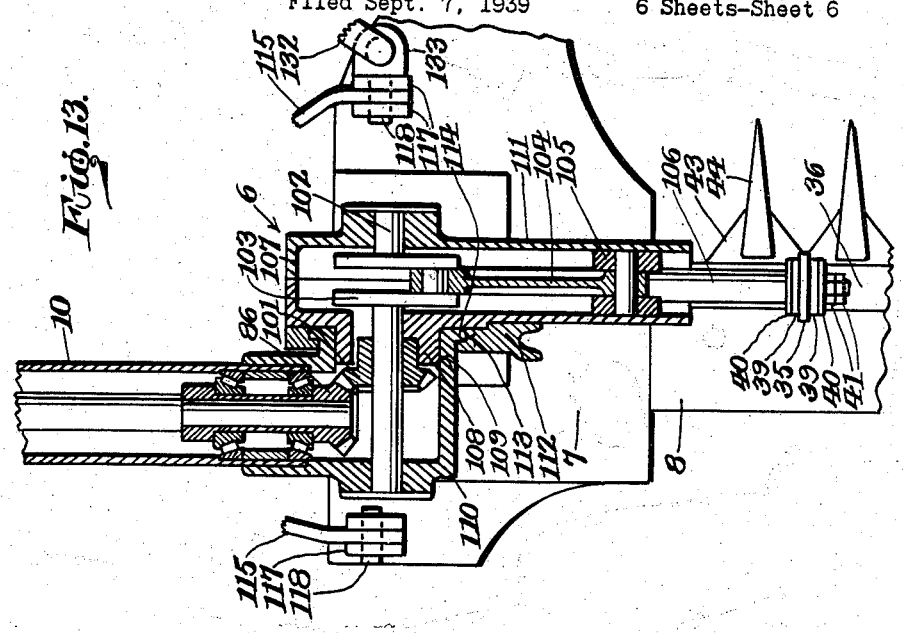
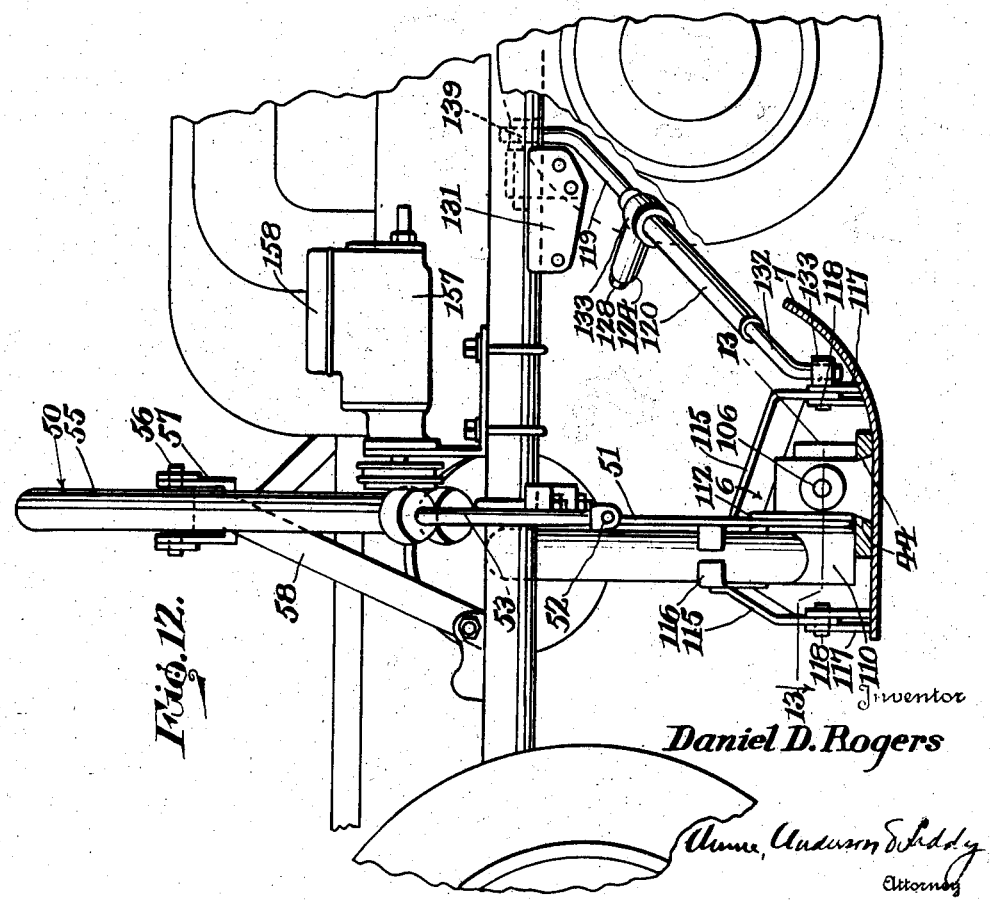
Inventor
Daniel D. Rogers
Attorney Patented Dec. 8, 1942

2,304,421

UNITED STATES PATENT OFFICE 2,304,421

CUTTING APPARATUS

Daniel D. Rogers, Columbia, S. C.; Laura L. Rogers, administratrix of said Daniel D. Rogers, deceased Application September 7, 1939, Serial No. 293,835

5 Claims. (Cl. 56—25)

This invention relates to improvements in cutting apparatus. It is concerned more directly with the cutting of vegetation, and is largely intended for use in the maintenance of grass and similar growths along the sides of highways in a presentable appearance, and to do so in such an effective manner that stumps, rocks, poles and the like will not offer any impediment to doing a good job of trimming.

Inasmuch as obstructions such as stumps, poles and the like are commonly found at roadsides, particular attention was paid to devising a construction which would yield if one of these were inadvertently struck, and also a construction which would enable cutting around such obstructions at least to a degree. Still further attention has been paid to providing for an arrangement wherein both slopes or banks of grass covered ditches could be cut. In fact the improved cutting apparatus is universally operable in the class of work for which it is intended.

With this premise in mind the objects of the invention are as follow:

First, to provide a cutting and trimming machine specifically intended for use in conjunction with tractor pulling power although not necessarily so, the cutter bar being capable of cutting operation in any position within limits, either high or low, or at any vertical angle within a 180° sector.

Second, to provide a cutting apparatus of the foregoing type wherein the cutter bar is subject to an automatic, so-called break-back action, in other words, an automatic release or break from its holding detent when encountering an obstruction in its path thereupon to swing back in a retracted position until restored.

Third, to provide a cutting apparatus that will cut vegetation on ditch banks, slopes, hedges, terraces and shoulders and any angle within the foregoing 180° limit, and at the same time be ready to automatically break-back to avoid damage to the cutter bar if a stump, stone or other obstruction should be encountered in any of the aforesaid positions.

Fourth, to provide a cutting apparatus in which the driving head constitutes a two-way swivel, this feature having the advantage of permitting the head and the cutter bar to swing either up and down or back at any cutting angle.

Fifth, to provide a hydraulic suspension and lift for the driving head and cutter bar respectively enabling the manipulation of these parts with great facility, said suspension including cables which provide for enough slack to let the cutter bar ride freely with the contour of the ground.

Sixth, to provide a movable arm for the mounting of the driving head and cutter bars, these latter parts being carried by the otherwise free extremity of said arm which, in turn, is carried by the tractor chassis from which it extends, this arrangement having a number of advantages one of which is to center the power transmission and housing units in a ditch so that the cutter bar can operate on the opposite bank.

Seventh, to provide a dove-tail driving head and cutter bar adjustment for easily and effectively registering the sickle blades with the guards or prongs.

Other objects and advantages will appear in the following specification, reference being had to the accompanying drawings in which Figure 1 is a plan view of the improved cutting apparatus, illustrating a part of the tractor or equivalent draft vehicle by which said apparatus is carried.

Figure 2 is a fractional plan view of the driving head and shoe, illustrating the break-back latch in section.

Figure 3 is a cross section taken substantially on the line 3—3 of Fig. 1 illustrating the adaptation of the driving head to a chain drive.

Figure 4 is a detail horizontal section as though taken on the line 4—4 of Fig. 3, illustrating the adaptation of the driving head to a belt drive.

Figure 5 is an enlarged vertical section taken substantially on the line 5—5 of Fig. 1.

Figure 6 is a longitudinal section of the belt drive taken substantially on the line 6—6 of Fig. 4.

Fig. 7 is a plan view of the cutting apparatus illustrating another form of the invention wherein the break-back action is limited by a restraining means.

Figure 8 is a detail horizontal section of the restraining means.

Figure 9 is a cross section taken substantially on the line 9—9 of Fig. 7.

Figure 10 is a cross section taken substantially on the line 10—10 of Fig. 7.

Fig. 11 is a cross section taken on the line 11—11 of Fig. 9.

Fig. 12 is a cross section taken on the line 12—12 of Fig. 7, most of the structure being shown in side elevation.

Fig. 13 is a horizontal section taken on the line 13—13 of Fig. 12.

In carrying out the invention use is made of a tractor 1 (Fig. 1) as the draft vehicle. A tractor is named merely for illustration because the cutting apparatus may be carried by other types of equipment, the only requirement being that there shall be facilities for driving the cutting apparatus, preferably from a mechanical power source. The tractor 1 includes chassis members 2 as well as the steering and drive wheels 3, 4. The direction of motion is as indicated by the arrow a (Fig. 1).

Several modifications of the invention are disclosed herein, but these are concerned with details for the operation of the driving head and in details for the retention of the driving head as well as its attached cutter bar in a normal operating position which consists of its right angular relationship to the chassis members 2 (Fig. 1). In all forms of the invention use is made of a carrying means 5 which does the actual carrying of the driving head 6, the shoe 7 and cutter bar 8. The driving head has a coupling 9 with the carrying means 5, providing for an up and down swinging of the driving head, shoe and cutter bar in reference to the carrying means 5 as well as a backward turning which is herein known as the break-back action, all without necessarily changing the position of the carrying means although this is provided for as is presently seen.

The carrying means 5 essentially is an arm 10. Actually it is a tubular casing, but whether this is a solid tube or is built of sections bolted together is immaterial. In Figs. 1, 3 and 5 it houses a drive chain 11. This chain is driven by a sprocket 12 (Figs. 3 and 5) on a counter shaft 13. This counter shaft is journaled in bearings 14 of any appropriate type, this being carried by one of the chassis members 2. The counter shaft 13 serves another additional purpose to driving the chain 11, namely it constitutes the hinge pin on which the carrying means 5 and all of its attached parts can be swung upwardly in reference to the tractor.

This swinging is designated by the dotted line position in Fig. 3, see arrow b. The counter shaft 13 carries a pulley 15 to which a driving belt 16 is applied after traversing several properly situated guide pulleys 17. Said belt is also applied to a driver 18 which is carried by a drive shaft 19. This shaft is suitably supported on the chassis of the tractor, and is adapted to be driven from the power source carried thereby.

The lower end of the chain 11 is applied to a sprocket 20 on the driving head shaft 21. This shaft constitutes the hinge pin on which the shoe 7 and cutter bar 8 are adapted to be swung either up or down (arrow c, Fig. 3). This can be accomplished without disturbing the position of the arm 10. The swinging of the shoe 7 and cutter bar 8 can be accomplished from any stated position of the arm 10 in reference to the tractor, within limits. The driving head 6 comprises a casting which can be made in any one of a variety of ways to suit the mechanism with which it is immediately concerned.

In Fig. 5 it comprises the casting 22 which has upright and horizontal parts 23, 24. The upright part 23 has a hub 25 which fits a bore 26 in the lower end 27 of the arm 10. It is this interfitting of the hub 25 with the lower end 27 that constitutes the previously mentioned coupling 9. The part 24 has a hub 25ᵃ which fits a bore 26ᵃ in an extension presently mentioned, the resulting coupling allowing for a horizontal swinging of the cutter bar 8 in reference to the driving head 6.

A crank shaft 28 is journaled in the horizontal part 24 and in a hollow extension 29 which is suitably affixed to the casting 22. This extension is primarily for the purpose of housing the crank 30 and affording room for its operation. The crank shaft 28 stands in the vertical position shown. The crank 30 is made as a part of the shaft and revolves in the horizontal plane. It has a link or pitman connection 31 with the head 32 (Fig. 3) of a pitman 33. Said pitman has bearing in a packing gland 34, the purpose of the packing being to retain the oil in the hollow extension 29.

Said pitman 33 has connection with the head 35 of a sickle bar 36. For this purpose the head 35 is part of a bracket, the base 37 of which is riveted at 38 to the sickle bar (Fig. 3). The pitman 33 has rubber shock absorbers 39 mounted upon it on each side of the head 35. These shock absorbers comprise rubber inserts which are backed by metal washers 40. Nuts 41 are screwed on to the threaded extremity of the pitman 33.

The foregoing driving connection between the crank shaft 28 and the sickle bar 36 is responsible for the reciprocation of the latter upon the cutter bar 8. This bar is equipped with prongs or guards 42. The sickle bar 36 carries knives 43 (Fig. 1) which work back and forth in reference to the guards. The result is that the vegetation is cut off as the mower is advanced therealong. Occasionally it is necessary to make an adjustment between the guards 42 and knives 43 in order to secure a proper registration. The amount of adjustment is ordinarily slight, and it is obtained by either screwing the nuts 41 inwardly against the shock absorbers or backing them off, the yielding of the rubber inserts in the first instance producing an adjustment of the sickle bar 36 in one direction, and their expansion in the other instance producing the adjustment in the opposite direction.

A dove-tail slot 44 (Fig. 3) provides for the mounting of the cutter bar 8. The dove-tail shape of this slot is indicated at 44 in Fig. 12. The end of the cutter bar is shaped to suit the slot. It will be positioned in the slot in any desired way, but in Fig. 1 is it shown adjustably mounted by means of set screws 45 passing through slots 45a in the shoe 7 so that when the cutter bar has been adjusted these screws are tightened to hold the cutter bar in its adjusted position. The adjustment of the nuts 41 in connection with the adjustment of the cutter bar by the set screws 45 will provide a double means of properly registering the cooperating cutting elements on the bar 8 and the sickle bar 36.

Reverting to the internal structure of the driving head 6, it is seen in Fig. 5 that the shafts 21, 28 are geared together by a pair of pinions 46, 47. The driving power of the shaft 21 is thus transmitted to the crank shaft 28 in an obvious manner. A cover 48 (Fig. 5) may be fixed in place over these pinions so as to exclude dirt. A sheave quadrant 49 is affixed to the upright part 23 of the casting 22 or to some equivalent portion thereof. This quadrant constitutes a part of a hydraulic suspension and lift generally designated 50 in Fig. 9. Said lift is shown in Figs. 9 and 12 only, but it is to be understood that the identical lift is used in conjunction with all of the other forms of the invention.

Referring now to Fig. 9 it is seen that the quadrant 49 has a cable 51 attached to it. Said cable is coupled at 52 to the rod 53 of a plunger 54 that works in the barrel 55. Said barrel is pivoted at 56 to a bracket 57 which extends off from a framing 58. Said framing is attached to the chassis members 2. In this instance the latter are shown tubular, but it is obviously immaterial what the cross section of these members is. Bracket 57 is hinged at 57ª.

A valve member 59 (Fig. 9) controls the flow of pressure fluid between the barrel 55 and a pressure fluid source 60. Said valve is turnable in the casing 61 by a handle 62. A pair of pipes 63, 64 extend from the casing 61 to the opposite end of the barrel 55. Similarly a pair of pipes 65, 66 extend from the valve casing 61 to the respective high pressure and low pressure sides 67, 68 of the source 60. The valve member 59 is of the twin port type. Said member could be substituted by some other valve arrangement as long as the substitute accomplishes the desired purpose.

A movement of the handle 62 to the dotted line position $d$ alters the neutral setting of the valve ports so that pressure fluid is delivered to the bottom end of the barrel 55 by way of the pipe 63. Fluid is discharged ahead of the plunger 54 to the low pressure side 68 by way of the pipes 64, 66. The result is a counterclockwise turning of the sheave 49 (arrow $e$, Fig. 9) with a corresponding swinging of the cutter bar on the hinge pin 21. A movement of the handle 62 to the dot and dash line position $f$ (Fig. 9) will admit high pressure fluid to the upper end of the barrel 55. The operator will have to use his judgment in this respect because the weight of the cutter bar will cause it to move clockwise (arrow $g$, Fig. 9) when the fluid is permitted to flow out from the nether side of the plunger 54.

Thus it is seen that the driving head 6 with its carried cutter bar 8 is capable of being swung on the shaft 21 as a hinge pin. The amuont of permissible swinging is approximately 180° as denoted by the arrows $e$, $g$, (Fig. 9).

The zone of operation of the cutter bar 8 is subject to regulation by a similar contrivance. The arm 10 has a clip 69 attached to it in some suitable way. A cable 70 has one of its ends secured to said clip, its other end being coupled at 71 to a rod 72 of a plunger 73 inside of the barrel 74. Said barrel is pivoted at 75 to the foregoing bracket 57. The two barrels are thus adapted to swing as may be needed. In each case the respective cables 51, 70 provide a flexible connection which, although suspending the driving head in its parts, have enough latent slack to compensate for any slight vibration of the cutter bar as when small uneven places in the ground are encountered, thereby to let the cutter bar ride freely with the contour of the ground without the danger of injury to the suspension apparatus. Such injury would occur if the connections between the hydraulic barrels and the driving head 6 and arm 10 were rigid.

A valve member 76 (Fig. 9) controls the flow of pressure fluid to and from the barrel 74. This is a twin ported valve, and it is turnable in a casing 77 by means of a handle 78. This casing has pipes 79, 80 leading to the lower and upper ends of the barrel. It also has pipes 81, 82 leading to the high pressure and low pressure sides 67, 68 of the source 60. A movement of the handle 78 to the dotted line position $h$ will cause an introduction of high pressure fluid to the lower end of the barrel 74. The arm 10 is thus raised, but in accomplishing this raising the operator must also shift the valve handle 62 toward the position $d$ (Fig. 9) so that the cutter bar 8 will not drag the ground.

It is easy to understand that any position of the arm 10 can be secured in respect to the tractor chassis, and any position of the driving head 6 and cutter bar 8 can be secured in respect to the arm 10 by properly manipulating the valves 59, 76. The mower is thus capable of being adjusted to any lay of the ground. An important use is the cutting of grass on the far slope of a ditch. The arm 10 is made to point down into the ditch and the cutter bar 8 is adjusted up at an angle so that the arm 10 and cutter bar 8 form a V.

Inasmuch as attention is now centered on Fig. 9 because of the showing of the hydraulic suspension and lift therein, other details shown here are now described. It is to be noted first of all that the former drive chain 11 is now substituted by a shaft 83 (Fig. 10). This shaft is supported by suitable bearings 84 inside of the arm 10 which now appears as a true tube. Said shaft has a pulley 85 at the upper end and a bevel gear 86 at the lower end. The pulley is driven by a belt 87 from a driver 88. This driver will be recognized as the equivalent of the driver 18 (Fig. 1). Said pulley and driver are also shown in Fig. 7 which is to be read in conjunction with Figs. 10, 12 and 13.

The support of the arm 10 in said Figs. 7, 9, 12 and 13 is derived from a hinge pin 89 (Fig. 9). This hinge pin is the equivalent of the cutter shaft 13 insofar as the hanging of the arm is concerned. In each case the arm 10 is adapted to swing up and down on the hinge pin (Fig. 9) or its equivalent thereof (Figs. 1 and 5). The hinge pin branches off to one side of a head 90 (Fig. 11). Said head has a pendent pin 91 which is socketed at 92 in a support 93 (Fig. 9) which is clamped to an adjacent chassis member 2.

Said pins 87, 91 are at right angles to each other and they constitute a two-way hinge. A leaf 94, in the form of a fairly heavy plate, swings from the hinge pin 89. Said leaf has an opening 95 which is occupied by the tubular arm 10. Said arm projects through the leaf 94 and is turnable in the opening 95. Said leaf carries a screw stud 96. The stud extends through a slot 97 (Fig. 11) in a segment 98.

Said segment is secured to the tubular arm 10 at 99, for example, by a weld. A thumb screw 100 is screwed onto the stud 96 against the segment 98. The purpose of this arrangement is to secure a turning adjustment of the tubular arm 10. This adjustment is possible only with that type of the invention wherein use is made of a drive shaft such as 83. It is not readily used in conjunction with that form embodying the drive chain 11 (Fig. 3) or the drive belt in Fig. 4.

In making the adjustment the thumb screw 100 is loosened and the segment 98 is turned one way or the other in reference to the pendent leaf 94. This cants the guards 42 either up or down because the result of said adjustment is to slightly turn the entire assemblage 10, 6 and 8, providing for a greater or less depth of cut.

Reverting to the gear 86 (Fig. 10) it is seen that said gear meshes with and drives a corresponding gear 101 on a crank shaft 102. This crank shaft is the equivalent of the crank shaft 28 (Figs. 3 and 5). The difference is that the crank shaft 102 is horizontal. Consequently this crank 102 (Fig. 13) revolves in the vertical plane. Said crank has a link connection 104 to the head 105 of the pitman 106. From there on the structure is identical with that already described in conjunction with Fig. 3.

In the instant form of the invention now under discussion the driving head 6 is shown to comprise a casting 107 which is the equivalent of the previously mentioned casting 22 (Fig. 5). This casting has a hub 108 which fits in the bore 109 in the enlarged lower end 110 of the tubular arm 10. The casting 107 has a hollow extension 111 which accommodates the crank 103 and other parts of the mower drive. In this instance the extension 111 is integral with the casting 107 and is capable of swinging only in the vertical plane.

For this purpose the attached sheave quadrant 112 (Fig. 13) is rabbeted at 103 to contain a rib 114 on the lower end 110. The attachment of the sheave is made to the casting 107. The rabbet and rib coupling produces a swivel which permits the foregoing vertical swinging of the extension 111 in reference to the arm 10. Horizontal swinging is not provided for here as in Fig. 5, this function now being transferred to the previously mentioned pendent pin 91 of the two-way hinge.

While still on the subject of that form of the invention in Figs. 7 to 13, note is made of the braces 115 (Figs. 7 and 12) which are suitably clamped at 116 to the arm 10 and reach out to forks 117 in which they are inserted and to which they are pivoted by hinge pins 118. The forks are integral parts of the shoe 7, and the purpose of the connection is to prevent horizontal turning of the shoe and its carried parts in reference to the arm 10. But vertical turning is intended, and to that end the hinge pins 118 are on a common center with the crank shaft 102, said shaft and hinge pins constitute the swivel on which vertical turning is accomplished when the hydraulic suspension means is actuated as already described.

Reference is now made to the break-back means upon which considerable emphasis is placed herein. The break-back means in Figs. 7 to 13 provides for only a 45° break-back action of the driving head and cutter bar assemblage. It constitutes a restraining means and its function is to keep said assemblage in a normal mowing position straight out from the vehicle as shown in Fig. 7. Said break-back or restraining means comprises a shaft 119 (Figs. 7 and 8) and a tubular housing 120 in telescopic relationship. The inner end of the shaft has a sleeve 121 affixed to it (Fig. 8). Said sleeve constitutes a stop and it is adapted to engage a corresponding but longer sleeve 122 affixed to the inside of the housing 120. The sleeve 122 constitutes an inner stop, and it is readily seen that when the shaft 119 and housing 120 are pulled apart, the corresponding horizontal turning movement of the cutter bar assemblage will be limited by the engagement of the two sleeves.

Detent means combined with the telescopic shaft 119 and housing 120 normally resists the tendency to extend and thus plays a part in the restraining function of said shaft 119 and housing 120. Said detent means consists of a ferrule 123 which is affixed to the housing 120 and carries a small cylinder 124 that extends off to one side. There is communication between said cylinder and the interior of the sleeve 122 through suitable openings, to accommodate a ball 125 which is pressed into a recess 126 in the shaft 119 by a fairly strong spring 127. Said spring has a threaded nut 128 for its abutment and adjustment as to tension. Said spring bears against a follower 129 which has direct contact with the ball 125.

The outer end of the shaft 119 has a two-way hinge connection 130 with a bracket 131 that is affixed to the contiguous chassis 2. This two-way hinge accommodates both vertical and horizontal swinging movements of the tubular arm 10 on the previously described two-way hinge 89, 91 (Fig. 9). A rod 132 (Fig. 7) has a two-way hinge connection 133 to one of the forks 117, also for the purpose of accommodating the foregoing movements of the arm 10. Said rod is screwed at 134 (Fig. 8) into a threaded insert 135 fixed in one end of the housing 120. This is for the purpose of adjustment and the adjustments accomplished by lifting the rod 132 out of the hinge connection 133, giving it the requisite number of turns and then setting it back in the hinge connection.

Reference is next made to Figs. 1 to 5. The break-back means disclosed here provides for a 90° break-back action. The cutter bar assemblage is adapted to swing back to the dotted line position i (Fig. 1) to constitute a full 90° turn, as distinguished from Fig. 7 wherein a turn of only half that amount can be made. Moreover, the break-back means of Figs. 1 to 5 provides for a total disconnection of the restraining means whereas in Fig. 7 the restraining means simply elongates but never disconnects. Use is made of a trussed frame 136 (Figs. 1 and 5). This frame is swung from the counter shaft 13 (Fig. 5). The latter has set collars 137 which aid in holding the trussed frame in position. Said frame prevents twisting of the mower while the cutter bar 8 is cutting at any vertical angle (arrows c, Fig. 3).

To this end the frame 136 has a detent 138 which is socketed at 139 (Fig. 5). Said detent fits in a fork 140 upstanding from the shoe 7. One of the tines of the fork carries a cylinder 141 which has communication with the inside of the fork through a tapered hole 142. Said hole provides a seat for a ball 143 that is pressed into the socket 139 by a spring 144. One end of said spring abuts a nut 145 which provides for the adjustment of its tension, the other end of the spring abutting a follower 146 which has direct contact with the ball.

Under ordinary working conditions the spring catch which the ball 143 comprises is strong enough to keep the shoe and cutter bar assemblage connected to the trussed frame 136. It is to be observed in Fig. 5 that the spring latch is directly on a center with the shaft 21. The spring catch is thus an element completing the hinge of which the shaft 21 was previously described as being the pin. Thus any vertical turning of the shoe and cutter bar assemblage (arrows c, Fig. 3) occurs on the common hinge 21, 143, but if the cutter bar should strike an obstruction, such as a stump or post, the spring latch 143 would yield, permitting the shoe and cutter bar assemblage to spring back (arrow j, Fig. 2).

It will be understood by now that the sickle bar 36 (Figs. 1 and 7) can be reciprocated either by a chain or shaft drive. Figs. 4 and 6 illustrate another mode of driving, namely by means of a pair of V-belts 147. These belts are secreted in the tubular arm 10 as before. Their lower ends are applied to a double V pulley 148. This pulley is attached to a horizontal crank shaft 149. This shaft constitutes the hinge for the shoe and cutter bar assemblage. It is on this hinge that said assemblage is swung vertically, distinguishing from Fig. 5 in which the crank shaft 28 constitutes the center of a hinge on which said assemblage is swung horizontally.

The shaft 149 has a crank 150 which has a link connection 151 to the head 152 of a pitman 153. Said parts are contained by a hollow extension 154 of a driving head casting 155. Said casting has a swivel connection at 156 with the lower end of the arm 10. The remainder of the structure from the pitman 153 out is the same as that already described in conjunction with Fig. 3.

Mention was made of the pressure fluid source 60 (Fig. 9). This source may involve any appropriate mechanism for the purpose, but the preferred mechanism consists of a hydraulic pump 157 (Fig. 12) and tank 158. The pipe connections shown in Fig. 9 are not joined to the tank 158 in Figs. 7 and 12 to avoid an unnecessary complication. It is necessary to say that the pump constitutes the high pressure side 67 and the tank the low pressure side 68. The pump is driven by a belt and pulley arrangement 159 (Fig. 7) from any properly rotating shaft 160 of the tractor.

The operation is readily understood. The invention consists of two major forms. These are illustrated in Figs. 1, 3 and 5 and in Figs. 7, 9 and 12, the distinction existing in the different arrangements of the break-back means. This break-back means is one of the important factors of the invention, its purpose being to permit a yielding of the shoe and cutter bar assemblage when striking a major obstruction in any mowing position.

In the first form the restraining means, typified by the spring catch 143 (Fig. 5), makes an actual disconnection from the frame 136 which can be pressed back to the chassis members, while in the second form of the invention (Fig. 7) there is never a disconnection but only an extension of the restraining means 119, 120 to accommodate the turning of the shoe and cutter bar assemblage. In either case said assemblage is restored to its right angular mowing position by a manual act.

With reference to all forms of the invention it is seen that the arm 10 plays the important part of reaching out from the tractor chassis to locate the mower off at a distance where the work is to be done. The hydraulic suspension and lift apparatus 50 (Fig. 9) is also common to all forms of the invention. Its purpose is to sustain the arm 10 in a given angular position and to sustain the shoe and cutter bar assemblage in the desired relationship to the arm. There can be a mutual inter-adjustment or the entire cutter bar assemblage can be adjusted in reference to the chassis. According to this principle, the cutting can be done on either near or far back of a ditch, or by suitably elevating the assemblage the mower can be made to trim the tops of a hedge.

It is thought unnecessary to enlarge upon the facility with which the machine can be adjusted, its purpose being obvious from the description above and from the drawings. In Figs. 1, 3 and 5 the arm 10 is only capable of swinging up and down on the shaft 13 which serves as a hinge pin. The driving head 6 is swiveled to the end of the arm and can be turned vertically independently of the arm as already pointed out, the shaft 21 (Fig. 5) acting as the hinge. The shoe and cutter bar assemblage 7, 8 is capable of turning independently in the horizontal direction, the shaft 28 (Fig. 5) then acting as the center of a hinge.

In Figs. 7, 9 and 12 the arm 10 can be turned both vertically and horizontally on the two-way hinge 89, 91. The shoe and cutter bar assemblage 7, 8 may turn vertically only, the shaft 102 (Fig. 13) providing the hinge.

I claim:

1. Cutting apparatus comprising a shoe, cutter bar and sickle bar assemblage, an arm extending off from a transporting vehicle and constituting carrying means for said assemblage, hinge means by which said arm is mounted at one end to said vehicle, a driving head serving as a coupling between the other end of said arm and the shoe, driving means going down inside of the arm, terminating in driving connections within the driving head between said driving means and said sickle bar, said driving connections including a shaft parallel to said hinge means and in turn comprising a hinge on which the assemblage is turnable, independent fluid suspension means for the arm and its carried assemblage, being independently operable to selectively turn the arm and said assemblage on the respective hinges to desired altitudes, and flexible elements tied in between the suspension means and the respective arm and assemblage, permitting yielding of the assemblage alone or together with the arm upon overriding a slightly high place in the ground.

2. Cutting apparatus comprising a shoe, cutter bar and sickle bar assemblage, an arm extending off from a transporting vehicle and constituting carrying means for said assemblage, a driving head serving as a coupling between said arm and shoe, driving means extending down inside of the arm, driving connections within the driving head between said driving means and said sickle bar, said driving connections including a horizontal shaft forming a hinge on which the assemblage is turnable in up and down directions, a sheave quadrant affixed to the driving head and centered on said shaft, and a suspension and lift device carried by said vehicle including a flexible connection to said sheave and being operable to pull in and let out the connection thus to turn the assemblage on said shaft.

3. Cutting apparatus comprising a shoe, cutter bar and sickle bar assemblage, an arm turnably mounted at one end on a transporting vehicle and extending off therefrom to carry said assemblage, a driving head coupling the other end of said arm to said assemblage, telescopic restraining means coupled between the shoe and vehicle keeping said assemblage in a normal mowing position straight out from the vehicle, and suspension means on the vehicle sustaining the assemblage in said position, but being yieldable upon a break-back action of said restraining means when the cutter bar strikes an obstruction to allow a turning back of said arm and its carried assemblage.

4. Cutting apparatus comprising a shoe, cutter bar and sickle bar assemblage, an arm turnably mounted at one end by a transporting vehicle and extending off therefrom to carry said assemblage, a driving head coupling the other end of said arm to said assemblage, restraining means coupled between the shoe and vehicle keeping said assemblage in a normal mowing position straight out from the vehicle, said restraining means being extensible but not disconnectible to accommodate a turning of the arm in reference to the vehicle and a consequent turning back of its carried assemblage, detent means embodied in the restraining means tending to resist its extension excepting as against an immovable obstruction, and suspension means on the vehicle sustaining the assemblage and being yieldable to said turning back action.

5. Cutting apparatus comprising a shoe, cutter bar and sickle bar assemblage, an arm extending off from a transporting vehicle and constituting carrying means for said assemblage, a two-way hinge providing the mount for the arm upon said vehicle, permitting vertical and horizontal swinging of said arm, means connecting the shoe to the arm and constituting a vertically swingable hinge, a hydraulic suspension and lift device including a pair of barrels, a bracket to which said barrels are independently pivoted, a framing to which the bracket is hinged, said barrels, pivots and shoe hinge providing for vertical and horizontal swinging of said suspension, plungers in the barrels having connections respectively to the arm and to the driving head, and valve means for controlling the flow of pressure fluid to and from the barrels for separately manipulating the plungers to actuate the arm and assemblage accordingly, said connections being yieldable to a horizontal swinging of the arm when said assemblage strikes an obstruction.

DANIEL D. ROGERS.